Aug. 18, 1931.   H. T. MASER   1,819,908
ELECTRIC TESTING CIRCUIT
Filed Oct. 1, 1930
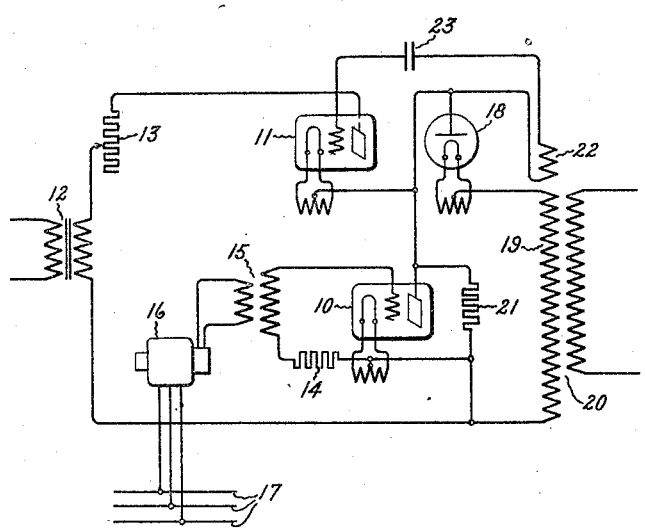
Inventor:
Harold T. Maser,
by Charles E. Tullar
His Attorney.

Patented Aug. 18, 1931

1,819,908

UNITED STATES PATENT OFFICE

HAROLD T. MASER, OF SCHENECTADY, NEW YORK, ASSIGNOR TO GENERAL ELECTRIC COMPANY, A CORPORATION OF NEW YORK

ELECTRIC TESTING CIRCUIT

Application filed October 1, 1930. Serial No. 485,675.

My invention relates to electric testing circuits and more particularly to such circuits for testing electric valves of large power output.

Electric valves of several types, such for example as the high vacuum pure electron discharge type, or the vapor electric type, having ratings of the order of 1000 kw. are now known in the art and commercially available. In the testing of these electric valves of large power rating, such large amounts of power are not always available or, if available, the use of them in testing of the valves entails large energy losses. Furthermore, in many of the circuits in which these high power valves are used, such as rectifier and inverter circuits, these valves are subjected to a potential, during that portion of the cycle in which they are nonconducting, which is opposite in direction to that which sends current through the valve and many times its magnitude. This potential is generally spoken of as the inverse potential and this inverse potential which a valve is capable of withstanding is an important characteristic which must be accurately determined.

In addition if the electric valve is to be used in an inverter circuit, its anode is subjected to a positive potential approximately twice that of the direct current circuit during the greater portion of the alternate half cycles in which the valve is non-conducting and it is important to determine whether the grid will satisfactorily prevent current flowing in the valve under these conditions. In order to test an electric valve under actual conditions of service, that is, while carrying its maximum rated current during one portion of the cycle, being subjected to its rated inverse voltage during another portion of the cycle, and having a positive potential impressed upon its anode during a third portion of the cycle which the grid must hold off, it has heretofore been necessary to provide a circuit substantially similar to that in which the valve was intended to operate which involved the disadvantages noted above.

It is an object of my invention to provide a new and improved circuit and method for testing an electric valve of large power rating which will involve the use of only a relatively small amount of power and at the same time simulate actual service conditions.

It is another object of my invention to provide a new and improved electric circuit and method for testing an electric valve of high power rating adapted to pass a large current through the valve during one portion of the cycle and to impress an inversed potential across the valves during another portion of the cycle.

It is a further object of my invention to provide new and improved electric circuit and method for testing an electric valve of high power rating adapted to pass a large current through the valve during one portion of the cycle, to impress a large positive potential upon the anode of the valve during another portion of the cycle and to impress a negative potential upon the grid of the valve during this latter portion of the cycle to prevent current flow in the valve.

In accordance with my invention I connect an electric valve to be tested in circuit with a second electric valve to be tested and a source of relatively low potential alternating current of a capacity equal to or greater than the rating of the valve. The first electric valve to be tested is also included in a second circuit which includes a third electric valve and a source of relatively high alternating potential. This third electric valve is so connected in the circuit that current is prevented from flowing during the positive half cycle of alternating potential so that this circuit provides only a high inverse potential during that portion of the cycle when the first electric valve to be tested is nonconducting. The second valve to be tested is provided with a control grid properly energized to prevent current flowing from the high potential source into the low potential circuit during the negative half cycle and thus test the holdoff capacity of the grid. In order properly to determine the potential distribution across the first valve to be tested and the third mentioned electric valve during the negative half cycle when no current is flowing in the high potential circuit, the first electric valve to be tested is shunted by a high resistance which draws a definite current. The inverse potential applied to the electric valve then may be easily determined by the potential drop across this resistor. If desired, a phase shifting means for the grid circuit of the first valve to be tested may also be provided in order to determine its control characteristics.

For a better understanding of my invention together with other and further objects thereof, reference is had to the accompanying drawing and its scope will be pointed out in the appended claims. The single figure of the drawing is a diagrammatic representation of my improved electric circuit for testing electric valves.

Referring to the drawing, I have provided a circuit for passing through an electric valve 10, which is one of the valves to be tested, the positive half waves of an alternating current of relatively low potential. This circuit comprises the valve 10, a second electric valve 11 which also may be under test, the secondary winding of a transformer 12 the primary winding of which is energized from any suitable alternating current source, and, if desired, a small resistance 13, which is preferably variable, for limiting the current delivered by the transformer 12, which would otherwise be short circuited through the electric valve 10. The grid circuit of the electric valve 10 includes a current limiting resistor 14, and the secondary winding of a transformer 15, the primary winding of which is energized from the secondary member of a rotary phase shifting transformer 16 energized from a three phase alternating current circuit 17. A circuit is also provided for impressing between the anode and cathode of the valve 10 a relatively high inverse potential. This circuit includes the electric valve 10, an electric valve 18, and the high potential secondary winding 19 of a transformer 20, the primary winding of which may be energized from any suitable alternating current circuit such as that which is connected to the transformer 12 or any other circuit having the same frequency and phase relation. A high resistance 21 is preferably connected in parallel to the electric valve 10. Means are also provided for rendering electric valve 11 nonconducting during the portion of the alternating current cycle in which a high inverse potential is applied to electric valve 10, in order to prevent current flowing from the high potential source into the low potential circuit which are connected in series opposition. As shown, this means comprises a control grid for the valve 11 energized from an auxiliary secondary winding 22 of the transformer 20 and a small capacitor 23 for securing the proper phase relations between the grid excitation of the valve 11 and the inverse alternating potential.

While I have referred above to a source of alternating current of relatively low potential for sending a current through the valves to be tested during alternate half cycles and to a source of relatively high potential for impressing an inverse voltage upon the valves during the other half cycles it will be understood that the ratings of these two alternating current circuits will be determined entirely by the ratings of the valves which are to be tested and that the terms relatively low potential and relatively high potential refer only to the relative potentials of the two alternating current circuits used to test a single valve. It is only necessary that the potential of the low potential circuit be sufficient to send a current of the desired magnitude through the impedance of the low potential circuit, while on the other hand the potential of the high potential circuit is determined entirely by the inverse potential rating of the valves to be tested. The ratio of these two potentials may often exceed that of 100-1.

In explaining the operation of the above described circuit, it will be assumed that a positive half wave of alternating current is being delivered by the transformer 12 to the low potential circuit and that the potential applied to the grid of electric valve 10 from the rotary phase shifting transformer 16 is in phase with the anode potential of this valve. Under these conditions current will flow through the electric valve 10 for the full half cycle, its magnitude being determined by the capacity of the transformer 12 and the adjustment of the resistor 13 at any desired value either less than or exceeding the current rating of the valve. By properly adjusting the setting of the rotary transformer 16, the electric valve 10 may be adjusted to become conducting at any time during this positive half cycle of the alternating current and the control characteristics of electric valve 10 may be determined as will be understood by those skilled in the art. Although the potential of the secondary winding 19 is also in such a direction as to tend to send current through the electric valve 10, this current is prevented from flowing by the unidirectional electric valve 18 which is so connected as to allow current to pass only in the opposite direction. Obviously, current cannot pass from the low potential circuit to the high potential circuit since these voltages are in opposition in the series circuit made up of the high potential and low potential circuits. It is seen that the electric valve 11 must have a current capacity equal to or greater than that of electric valve 10 since it is connected in series with the valve 10.

During the succeeding negative half cycle of alternating potential, the potential of the anodes of the electric valves 10 and 11 is negative with respect to their cathodes so that no current will flow from the transformer 12 in this low potential circuit. Similarly, the potential supplied from the secondary winding 19 to the electric valve 10 is opposite in direction to that in which it is conductive. However, a very small current will flow from this winding 19 through the high resistor 21 and the electric valve 18 which is oppositely connected in this series circuit. Practically the whole potential of the winding 19 appears across the terminals of the resistor 21 and is thus impressed between the anode and cathode of electric valve 10 to test its inverse potential characteristics. It will be noted that electric valves 11 and 18 are similarly connected in the series circuit made up of the low potential and the high potential circuits, so that current would tend to flow from the transformer winding 19 through the low potential transformer 12 and the electric valves 11 and 18 in series. In order to prevent this transfer of current from the high potential to the low potential circuit and test the hold-off capacity of the grid of the valve 11, the grid of the electric valve 11 is energized with a high negative potential from the auxiliary secondary winding 22 of the transformer 20. In some cases it may be found desirable to include the small capacitor 23 for securing the proper phase adjustment so that the electric valve 11 will be nonconducting during the complete half cycle in which an inverse potential is applied to the electric valve 10. If desired, the valves 10 and 11 may be interchanged, and the test repeated in order to determine the various characteristics of the valves. While my improved testing circuit is particularly applicable to electric valves of the vapor discharge type, it may also be applied to electric valves of any of the other several types well known in the art.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. The method of testing an electric valve provided with an anode and a cathode which comprises passing between said anode and cathode for one interval of time a relatively low potential current of the same order of magnitude as the rating of the valve and impressing between said anode and cathode for a second interval of time a potential of opposite polarity and of the same order of magnitude as the inverse potential rating of the valve.

2. The method of testing an electric valve provided with an anode and a cathode which comprises passing between said anode and cathode for one interval of time a relatively low potential current and impressing between said anode and cathode for a second interval of time a relatively high potential of opposite polarity.

3. The method of testing an electric valve provided with an anode and cathode in a manner simulating actual service conditions which comprises alternately impressing between said anode and cathode a relatively low potential current and a relatively high potential of opposite polarity respectively.

4. The method of testing an electric valve provided with an anode and cathode which comprises passing between said cathode and anode an alternating current of relatively low potential, interrupting said current during alternate half cycles, impressing between said cathode and anode a relatively high alternating potential of opposite polarity, and interrupting said potential during the half cycles when the current is passing through the valve.

5. The method of testing an electric valve provided with an anode, a cathode, and a control grid, which comprises passing between said anode and cathode for one interval of time a relatively low potential current and simultaneously impressing a variable potential upon said grid to control the current passing through said valve, and impressing between said anode and cathode for a second interval of time a relatively high potential of opposite polarity.

6. Apparatus for testing an electric valve provided with an anode and cathode comprising means for passing a relatively low potential current between said anode and cathode for one interval of time, and means for impressing between said anode and cathode a relatively high potential of opposite polarity during a second interval of time.

7. Apparatus for testing an electric valve provided with an anode and cathode comprising a source of current of relatively low potential, a source of relatively high potential, and means for alternately connecting said sources between said anode and cathode with opposite polarities.

8. Apparatus for testing an electric valve provided with an anode and cathode comprising a source of relatively low potential alternating current, a source of relatively high alternating potential of the same frequency and phase relation as said alternating current, and means for alternately connecting said sources between said anode and cathode with opposite polarities during successive half-cycles.

9. Apparatus for testing an electric valve comprising a circuit including said valve and a source of alternating current of relatively low potential, a second circuit including said valve and a source of relatively high alternating potential of the same frequency and phase relation as said first mentioned source, and means for alternately interrupting the flow of energy from said sources during successive half-cycles.

10. Apparatus for testing an electric valve comprising a circuit including said valve, a source of relatively low potential alternating current and a unidirectional electric valve, and a second circuit including said valve to be tested, a second unidirectional electric valve, and a source of relatively high alternating potential of the same frequency and phase relation with respect to the valve to be tested as said alternating current, said unidirectional valves being so connected as to afford a conductive path between said valve to be tested and only one of said sources at any time.

11. The method of testing an electric valve provided with an anode, a cathode and a control grid which comprises passing between said anode and said cathode for one interval of time a relatively low potential current of the same order of magnitude as the rating of the valve, impressing between said anode and cathode for a second interval of time a relatively high potential of the same polarity and simultaneously impressing a negative potential upon said control grid.

12. The method of testing an electric valve provided with an anode, a cathode and a control grid in a manner simulating actual service conditions which comprises alternately impressing between said anode and cathode a relatively low potential and a relatively high potential of the same polarity and during said second interval impressing upon said control grid a negative potential.

13. The method of testing an electric valve provided with an anode, a cathode and a control grid which comprises passing between said anode and cathode an alternating current of relatively low potential, interrupting said current during alternate half cycles, impressing between said cathode and anode a relatively high alternating potential of the same polarity and simultaneously impressing a negative potential upon said control grid, and interrupting said high potential during the half cycles when current is passing through the valve.

14. Apparatus for testing an electric valve provided with an anode, a cathode and a control grid comprising means for passing a relatively low potential current between said anode and cathode for one interval of time, means for impressing between said anode and cathode a relatively high potential of the same polarity, during a second interval of time, and means for simultaneously impressing a relatively high negative potential upon said control grid.

15. Apparatus for testing an electric valve provided with an anode, a cathode and a control grid comprising a source of relatively low potential current of a source of relatively high potential, means for alternately connecting said sources between said anode and cathode with the same polarity, and means for impressing a negative potential upon said control grid when said high potential is impressed upon said valve.

16. Apparatus for testing an electric valve provided with an anode, a cathode and a control grid comprising a source of relatively low potential alternating current, a source of relatively high alternating potential of the same frequency and phase relation as said alternating current, means for alternately connecting said sources between said anode and cathode with the same polarity during successive half cycles, and means for impressing a negative potential upon said control grid when said valve is connected to said high potential source.

17. Apparatus for testing an electric valve provided with a control grid comprising a circuit including said valve and a source of alternating current of relative low potential, a second circuit including said valve and a source of relatively high alternating potential of the same frequency and phase relation as said first circuit source, means for alternately interrupting the flow of energy from said sources during successive half cycles, and means for impressing a negative potential upon said control grid when said valve is connected to said high potential source.

18. The method of testing an electric valve provided with an anode, a cathode and a control grid which comprises passing between said anode and cathode for one interval of time a relatively low potential current, impressing between said anode and cathode for a second interval of time a relatively high potential of the same polarity, and simultaneously impressing upon said control grid a negative potential, and impressing between said anode and cathode for a third interval of time a relatively high potential of opposite polarity.

19. Apparatus for testing a pair of electric valves comprising a circuit including said valves and a source of relatively low potential alternating current, a second circuit including the first of said valves to be tested, a unidirectional electric valve, and a source of relatively high alternating potential of the same frequency and phase relation as said alternating current, said unidirectional valve and said second valve to be tested being so connected as to alternately afford a conductive path between said first valve to be tested and said sources during successive half cycles, and means for rendering said second valve to be tested non-conducting while said first valve to be tested is energized from said high potential source.

20. Apparatus for testing a pair of electric valves, each provided with an anode and cathode comprising a circuit including said valves and a source of relatively low potential alternating current, a second circuit including the first of said valves to be tested, a unidirectional electric valve and a source of relatively high alternating potential of the same frequency and phase relation as said current source, said unidirectional valve and said second valve to be tested being so connected as to afford alternately a conductive path between said first valve to be tested and said sources during successive half-cycles, and means for preventing the flow of energy from said high potential source to said low potential circuit comprising a grid circuit for said second valve to be tested including a potential derived from said high potential source of such polarity that said grid and the anode of said first valve to be tested have the same polarity.

21. Apparatus for testing a pair of electric valves, each provided with an anode, a cathode and a control grid comprising a circuit including said valves and a source of relatively low potential alternating current, means for applying to the grid of the first of said valves a potential variable in phase with respect to the anode potential of said valve to vary the flow of current therein, and a second circuit including said first valve to be tested, a unidirectional electric valve, and a source of relatively high alternating potential of the same frequency and phase relation as said alternating current, said unidirectionl valve and said second valve to be tested being so connected as to afford alternately a conductive path between said first valve to be tested and said sources during successive half-cycles.

22. Apparatus for testing a pair of electric valves comprising a circuit including said valves and a source of relatively low potential alternating current, a second circuit including said first valve to be tested, a unidirectional electric valve and a source of relatively high alternating potential of the same frequency and phase relation as said alternating current, said unidirectional valve and said second valve to be tested being so connected as to afford alternately a conductive path between said first valve to be tested and said sources during successive half cycles, and an impedance connected in parallel to said first valve to be tested to determine the distribution of the high potential between said valve and the unidirectional valve included in the high potential circuit.

In witness whereof, I have hereunto set my hand this 26th day of September, 1930.

HAROLD T. MASER.